United States Patent Office 3,291,841
Patented Dec. 13, 1966

3,291,841
PROCESS FOR THE PREPARATION OF BENZYL ETHERS
Francis X. O'Shea, Wolcott, Conn., assignor to United States Rubber Company, New York, N.Y., a corporation of New Jersey
No Drawing. Filed Aug. 1, 1963, Ser. No. 299,188
3 Claims. (Cl. 260—611)

This invention is concerned with a novel method for preparing compounds of the type:

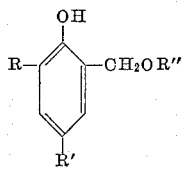

in which R, R' and R'' are alkyl, cycloalkyl or aralkyl groups of up to 12 carbon atoms each. This method involves the reaction of one molar equivalent of a compund of the general formula:

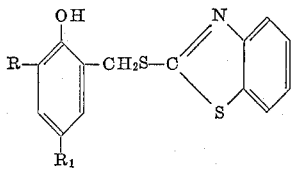

and in which R and R' are alkyl, cycloalkyl or aralkyl groups of up to 12 carbon atoms each with one molar equivalent of an alkali metal hydroxide and at least one molecular equivalent of an alcohol.

In U.S. Patent 2,954,345 (Sept. 27, 1960), A. H. Filbey disclosed as antioxidants compounds of the general formula:

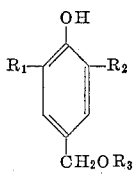

wherein $R_1$ is an alkyl group containing from 3 to 8 carbon atoms and is branched on the alpha-carbon atom, $R_2$ is an alkyl group of 1 to 8 carbon atoms and $R_3$ is alkyl, cycloalkyl, aralkyl or alkenyl. The method employed to prepare these compounds involved the direct reaction of a 2,6-dialkylphenol with formaldehyde and a monohydric alcohol in the presence of a catalytic quantity of an alkali or alkaline earth metal hydroxide condensation catalyst.

In U.S. Patent 2,769,784 (Nov. 6, 1956), D. W. Young and D. L. Cottle described as antioxidants compounds of the general formula:

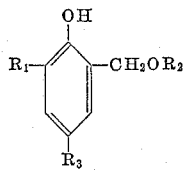

wherein $R_1$ is selected from the group consisting of hydrogen and —$CH_2OR_2$ radicals, $R_2$ is a branched chain alkyl radical of 8 to 15 carbon atoms, and $R_3$ is selected from the group consisting of alkyl radicals of 1 to 4 carbon atoms, alkoxy radicals of 1 to 4 carbon atoms and alkyl phenol radicals represented by the structure:

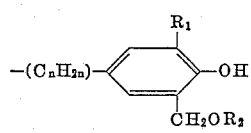

where $n$ is an integer ranging from 1 to 4 and $R_2$ is an alkyl radical of 8 to 15 carbon atoms. These compounds are prepared by condensation of a phenol in the presence of a Friedel-Crafts catalyst with one to two moles of a chloromethyl alkyl ether wherein said alkyl group is derived from a $C_8$ to $C_{15}$ alcohol.

P. D. Gardner and coworkers [J. Am. Chem. Soc., 81, 3364 (1959)] have described the reaction of phenolic Mannich base methiodides with alkoxide ion to produce alkoxymethyl substituted phenols, for example:

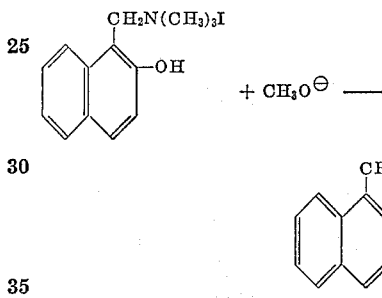

This invention differs from the prior art in the following way:

(1) The method herein disclosed is novel. It has not been previously described.

(2) The method described by Filbey is not applicable to 2,4-dialkylphenols.

(3) The method herein described has much broader scope than that described by Young and Cottle. For example, any alcohol may be used in the present method whereas Young and Cottle describe the use of $C_8$ to $C_{15}$ alcohols only. In addition, the method of Young and Cottle employs a Friedel-Crafts catalyst. It is expected therefore that branched chain alkylated phenols such as 2-t-butyl-p-cresol could not be used because of the danger of dealkylation. It is not surprising, therefore, that Young and Cottle do not mention the use of this type of phenol. Our method, employing an alkali catalyst, does not cause dealkylation.

(4) The method herein described is superior to the reaction described by Gardner because phenolic Mannich base methiodides are costly and sometimes difficult to prepare due to the use of methyl iodide. In addition the secondary amine used to prepare the Mannich base is converted by the subsequent reaction to a tertiary amine and is therefore not suitable for recovery and reuse. The present intermediates on the other hand are easier and less expensive to prepare and the mercaptobenzothiazole used to prepare the intermediates is recoverable from the subsequent reaction.

In accordance with the invention, 2,4-dialkyl-6-alkoxymethylphenols are prepared by treating one molar equivalent of a compound of the general formula:

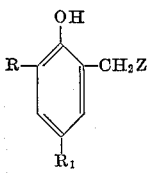

wherein Z is the mercaptobenzothiazolyl radical:

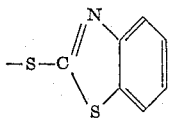

and in which R and R' are alkyl, cycloalkyl or aralkyl groups of up to 12 carbon atoms each, with one molar equivalent of an alkali metal hydroxide and at least one molar equivalent of an alcohol of the general formula:

in which R″ is an alkyl, cycloalkyl or aralkyl group of up to 12 carbon atoms. If desired R″ may be hydroxyalkyl, that is, the alcohol may be a glycol.

The equation for this reaction is therefore:

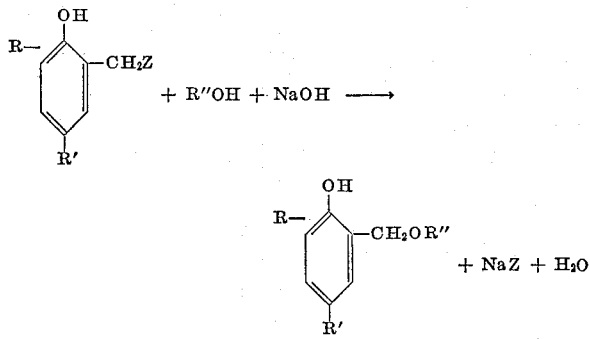

The reaction is ordinarily carried out using the alcohol reactant in excess as the solvent. This is particularly advantageous for the lower, water miscible alcohols. The reaction may also be carried out in a non-reactive solvent such as dioxane or ethylene glycol dimethyl ether. The reaction may be carried out from about room temperature to 100° C. or higher. Ordinarily it is carried out at the reflux temperature of the solvent.

The intermediate compounds (mercaptobenzothiazolylmethyl substituted phenols) may be prepared from a 2,4-dialkylphenol by reaction with formaldehyde and mercaptobenzothiazole under acid catalysis in a reaction similar to that described by Sebrell in U.S. Patents 2,134,957, (Nov. 1, 1938) and 2,150,463 (Mar. 14, 1939).

The phenols which may be used include 2,4-dimethylphenol,
2-methyl-4-t-butylphenol,
2-t-butyl-4-methylphenyl,
2,4-di-t-butylphenol,
2-methyl-4-cyclohexylphenol,
2-cyclohexyl-4-methylphenol,
2,4-dicyclohexylphenol,
2-methyl-4-t-octylphenol,
2-t-octyl-4-methylphenol,
2,4-di-t-octylphenol,
2-methyl-4-nonylphenol,
2-nonyl-4-methylphenol,
2,4-dinonylphenol,
2-methyl-4-(alpha-methylbenzyl)phenol,
2-(alpha-methylbenzyl)-4-methylphenol,
2,4-di(alpha-methylbenzyl)phenol,
2-methyl-4-(alpha,alpha-dimethylbenzyl)phenol,
2,4-di(alpha,alpha-dimethylbenzyl)phenol, etc.
2,4-di(alpha, alpha-dimethylbenzyl)phenol, etc.

*Example 1*

The preparation of 2-t-butyl-4-methyl-6-(beta-hydroxyethoxymethyl) phenol.

2 - hydroxy-3-t-butyl-5-methylbenzyl 2-benzothiazolyl sulfide was first prepared as follows: 2-mercaptobenzothiazole (584.5 g., 3.5 moles) was suspended in one liter of isopropyl alcohol in a 3-liter, 3-neck flask equipped with a mechanical stirrer, condenser, thermometer and addition funnel. To the suspension was added 292 g. (3.6 moles) of 37% aqueous formaldehyde and the mixture was warmed to 60–70° C. for 30 minutes. 2-t-butyl-p-cresol (492 g., 3 moles) was then added followed by 100 ml. of concentrated hydrochloric acid. The mixture was then refluxed for four hours with stirring, the crystalline product beginning to precipitate out after one hour. The mixture was cooled and the product was filtered off, washed with isopropyl alcohol and dried. The yield of 2-hydroxy-3-t-butyl-5-methylbenzyl 2-benzothiazolyl sulfide was 744 g. (72%), M.P. 164–165° C.

The 2 - hydroxy - 3 - t - butyl - 5 - methylbenzyl 2-benzothiazolyl sulfide (32.2 g., 0.098 mole) was suspended in 200 ml. of ethylene glycol (in this case the ethylene glycol is both the R″OH reactant described above and the solvent carrier for the reaction) and a solution of 6.6 g. (0.1 mole) of 85% potassium hydroxide in 10 ml. of water was added. The mixture was stirred and heated at 70–80° C. for four hours. Solution was almost complete. The mixture was filtered and the filtrate was diluted with water. Cloudiness was followed by separation of an oil which then crystallized. The product was extracted with hexane and the hexane extract was evaporated to an oil which crystallized. The yield of 2 - t - butyl - 4 - methyl - 6 - (beta - hydroxyethoxymethyl)phenol was 17 g. (78%), M.P. 52–54° after recrystallization from hexane.

*Analysis.*—Calc'd: C, 70.7%; H, 9.3%. Found: C, 70.2%; H, 9.5%.

*Example 2*

The preparation of 2-t-butyl-4-methyl-6-(methoxymethyl)phenol.

A mixture of 34.3 g. (0.1 mole) of 2-hydroxy-3-t-butyl-5-methylbenzyl benzothiazolyl sulfide and 17 ml. (0.1 mole) of 6 N NaOH in 100 ml. of methanol was heated on the steam bath for 45 minutes. The solution was then diluted with water and the product was extracted with hexane. The hexane layer was washed with water and dried over potassium carbonate. The solution was then filtered and evaporated on the steam bath to a liquid residue. The yield of 2-t-butyl-4-methyl-6-(methoxymethyl)phenol was 19 g. (91%).

In a similar manner, the following representative chemicals may be prepared:

2,4-dimethyl-6-methoxymethyl phenol
2-methyl-4-t-butyl-6-methoxymethyl phenol
2-octyl-4-methyl-6-ethoxymethyl phenol
2-(alpha,alpha-dimethylbenzyl)-4-methyl-6-ethoxymethyl phenol
2-cyclohexyl-4-methyl-6-ethoxymethyl phenol
2-t-butyl-4-methyl-6-isopropoxymethyl phenol
2-t-butyl-4-methyl-6-butoxymethyl phenol
2-t-butyl-4-methyl-6-cyclohexyloxymethyl phenol
2-t-butyl-4-methyl-6-benzyloxymethyl phenol
2-t-butyl-4-methyl-6-dodecyloxymethyl phenol
2,4-di(alpha,alpha-dimethylbenzyl)-6-methoxymethyl phenol
2-dodecyl-4-methyl-6-methoxymethyl phenol
2,4-dicyclohexyl-6-methoxymethyl phenol Preferred starting materials are those selected from the group consisting of 2-hydroxy-3,5-dialkylbenzyl benzothiazolyl sulfide, 2 - hydroxy - 3 - aralkyl - 5 - alkylbenzyl benzothiazolyl sulfide, and 2-hydroxy-3,5-diaralkylbenzyl benzothiazolyl sulfide.

Preferred products are those selected from the group consisting of 2,4 - dialkyl - 6 - alkoxymethyl phenols, 2,4-dialkyl - 6 - (hydroxyalkoxymethyl)phenols, 2 - aralkyl-4 - alkyl - 6 - alkoxymethyl phenols, and 2,4 - diaralkyl-6-alkoxy-methyl phenols.

The products made by the method of the invention are useful as antioxidants, especially for rubbers (e.g. natural rubber, butadiene-styrene copolymer, polyisoprene, polybutadiene, ethylene-propylene copolymer, ethylene-propylene-dicyclopentadiene copolymer, ethylene-propylene-hexadiene copolymer, and the like), as well as for other purposes. They are useful intermediates for other chemicals. Thus, for example, 1 part of the chemical of Examples 1 or 2 above added to 100 parts of natural rubber or SBR improves the age resistance of the rubber.

Having thus described my invention, what I claim and desire to protect by Letters Patent is:

1. A method of preparing a compound of the formula:

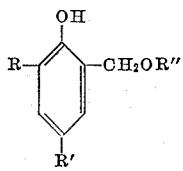

in which R, R' and R" are selected from the group consisting of alkyl, cycloalkyl and aralkyl groups of up to 12 carbon atoms each, comprising heating one molar equivalent of a compound of the formula:

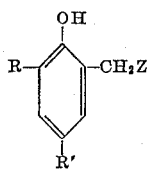

wherein R and R' are as previously defined and Z is mercaptobenzothiazolyl radical:

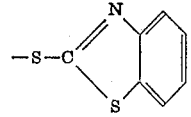

with one molar equivalent of an alkali metal hydroxide and at least one molecular equivalent of an alcohol of the formula

R"OH in which R" is as previously defined, at a temperature of from room temperature to 100° C.

2. A method for preparing 2-t-butyl-4-methyl-6-(beta-hydroxyethoxymethyl)phenol, comprising heating at a temperature between room temperature and 100° C. one molar equivalent of 2-hydroxy-3-t-butyl-5-methylbenzyl 2-benzothiazolyl sulfide in a solution of 1 molar equivalent of alkali metal hydroxide in at least one molar equivalent of ethylene glycol, and subsequently recovering said 2-t-butyl-4-methyl - 6 - (beta-hydroxymethyl)phenol from the reaction mixture.

3. A method of preparing 2-t-butyl-4-methyl-6-(methoxymethyl)phenol, comprising heating at reflux temperature one molar equivalent of 2-hydroxy-3-t-butyl-5-methylbenzyl benzothiazolyl sulfide in a solution of 1 molar equivalent of alkali metal hydroxide in at least one molar equivalent of methanol, and subsequently recovering said 2 - t - butyl - 4 - methyl - 6 - (methoxymethyl) phenol from the resulting mixture.

No references cited.

LEON ZITVER, *Primary Examiner.*

B. HELFIN, *Assistant Examiner.*